(12) United States Patent
Lai et al.

(10) Patent No.: US 8,500,991 B2
(45) Date of Patent: Aug. 6, 2013

(54) HIGH ACTIVITY MTT FRAMEWORK TYPE MOLECULAR SIEVES

(75) Inventors: Wenyih F. Lai, Bridgewater, NJ (US); Christine N. Elia, Bridgewater, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 529 days.

(21) Appl. No.: 12/653,038

(22) Filed: Dec. 8, 2009

(65) Prior Publication Data

US 2010/0147741 A1 Jun. 17, 2010

Related U.S. Application Data

(60) Provisional application No. 61/201,916, filed on Dec. 16, 2008.

(51) Int. Cl.
*C10G 73/02* (2006.01)
*C10G 73/38* (2006.01)
*C01B 39/04* (2006.01)
*B01J 29/06* (2006.01)

(52) U.S. Cl.
USPC ............ 208/27; 208/28; 423/704; 423/709; 502/71; 502/77

(58) Field of Classification Search
USPC ............... 208/27, 28; 423/704, 709; 502/71, 502/77
See application file for complete search history.

(56) References Cited

U.S. PATENT DOCUMENTS

| | | | |
|---|---|---|---|
| 3,354,078 A | 11/1967 | Miale et al. | |
| 4,076,842 A | 2/1978 | Plank et al. | |
| 4,490,342 A | 12/1984 | Valyocsik | |
| 5,053,373 A | 10/1991 | Zones | |
| 5,194,412 A | 3/1993 | Roberie et al. | |
| 5,252,527 A | 10/1993 | Zones | |
| 5,332,566 A * | 7/1994 | Moini | 423/705 |
| 5,405,596 A | 4/1995 | Moini et al. | |
| 6,099,820 A | 8/2000 | Miller | |
| 6,692,723 B2 | 2/2004 | Rouleau et al. | |
| 7,157,075 B1 | 1/2007 | Burton, Jr. et al. | |
| 7,390,763 B2 | 6/2008 | Zones et al. | |
| 2005/0092651 A1 * | 5/2005 | Zones et al. | 208/27 |

OTHER PUBLICATIONS

Weisz, et al., "Superactive Crystalline Aluminosilicate Hydrocarbon Catalysts", Journal of Catalysis, vol. 4, p. 527-529 (1965).
Miale, et al., "Catalysis by Crystalline Aluminosilicates: IV. Attainable Catalytic Cracking Rate Constants, and Superactivity", Journal of Catalysis, vol. 6, p. 278-287 (1966).
Olson, et al., Journal of Catalysis, vol. 61, p. 390 (1980).

* cited by examiner

*Primary Examiner* — Randy Boyer
(74) *Attorney, Agent, or Firm* — Robert A. Migliorini (57) ABSTRACT

A process is described of producing an MTT framework type molecular sieve by crystallizing a mixture capable of forming said molecular sieve, wherein the mixture comprises sources of alkali or alkaline earth metal (M), an oxide of trivalent element (X), an oxide of tetravalent element (Y), water and a directing agent (R) of the formula $(CH_3)_3N^+CH_2CH_2CH_2N^+(CH_3)_2CH_2CH_2CH_2N^+(CH_3)_3$, and has a composition, in terms of mole ratios, within the following ranges.

| | |
|---|---|
| $YO_2/X_2O_3$ | less than 45 |
| $H_2O/YO_2$ | 5 to 100 |
| $OH^-/YO_2$ | 0.05 to 0.5 |
| $M/YO_2$ | 0.05 to 0.5 and |
| $R/YO_2$ | >0 to <0.5. |

19 Claims, 4 Drawing Sheets

HIGH ACTIVITY MTT FRAMEWORK TYPE MOLECULAR SIEVES

CROSS-REFERENCE TO RELATED APPLICATIONS

This application claims priority to U.S. Provisional Application Ser. No. 61/201,916 filed Dec. 16, 2008 herein incorporated by reference in its entirety.

FIELD

This invention relates to high activity molecular sieves having the MTT framework type, their synthesis and their use in catalytic processes.

BACKGROUND

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the *Atlas of Zeolite Framework Types*, 6th edition, Elsevier, London, England (2007).

One known molecular sieve for which a structure has been established is the material designated as MTT, which is a molecular sieve having pores defined by parallel channels having cross-sectional dimensions of about 4.5 Angstrom by about 5.2 Angstrom. Examples of MTT framework type molecular sieves include ZSM-23, SSZ-32, EU-13, ISI-4 and KZ-1. MTT framework type materials are of significant commercial interest because of their activity as catalysts in dewaxing of paraffinic hydrocarbons.

ZSM-23, the first molecular sieve isolated with an MTT framework type, and its preparation in the presence of a pyrrolidine directing agent are taught by U.S. Pat. No. 4,076,842, the entire disclosure of which is incorporated herein by reference. According to the '842 patent, ZSM-23 has a composition, in the anhydrous state, expressed in terms of mole ratios of oxides, as follows:

$$(0.58\text{-}3.4)M_{2/n}O:Al_2O_3:(40\text{-}250)SiO_2$$

wherein M is at least one cation having a valence n.

U.S. Pat. No. 4,490,342 discloses that ZSM-23 can be synthesized from a reaction mixture containing an organic cation of the formula $(CH_3)_3N^+—R_1—N^+(CH_3)_3$ wherein $R_1$ is a saturated or unsaturated straight chain hydrocarbon group having seven carbon atoms (commonly referred to as Diquat-7). In the Examples, the ZSM-23 products have a silica to alumina molar ratio between 41 and 420.

U.S. Pat. No. 5,332,566 discloses that ZSM-23 can be synthesized from a reaction mixture having a silica to alumina molar ratio between 30 and 300 and containing an organic cation of the formula $(CH_3)_3N^+CH_2CH_2CH_2N^+(CH_3)_2CH_2CH_2CH_2N^+(CH_3)_3$ (commonly referred to as Triquat-7). Product aluminum concentrations are not reported and all the Examples operate at reaction mixture $SiO_2/Al_2O_3$ ratios of 45 or above.

In addition, U.S. Pat. No. 5,405,596 reports the synthesis of ZSM-23 in the presence of Diquat-12, $(CH_3)_3N^+(CH_2)_{12}N^+(CH_3)_3$, but using reaction mixtures having silica to alumina molar ratios in excess of 60. Again product aluminum concentrations are not reported.

As noted above, MTT framework type materials, such as ZSM-23, are useful as dewaxing catalysts and, for such applications, it is found that activity and/or selectivity are generally improved when the molecular sieve product has a low silica to alumina molar ratio and a small crystal size. Unfortunately, however, aluminum can be a crystallization inhibitor with certain zeolites, including MTT framework type materials, so that with most existing synthesis routes it is difficult to produce low silica to alumina molar ratio, that is, less than 30:1, zeolites without significant production of impurity phases, particularly FER framework type materials.

U.S. Pat. Nos. 5,053,373 and 5,252,527 disclose that SSZ-32, which is purported to be a high aluminum content zeolite of the MTT framework type, can be synthesized using N-lower alkyl-N'-isopropyl-imidazolium cations as a directing agent. SSZ-32 is said to have a silica to alumina molar ratio of 20 to less than 40 but the lowest silica to alumina molar silica to alumina molar ratio reported in the Examples is 32.

U.S. Pat. No. 6,099,820 discloses a method of synthesizing MTT framework type zeolites in the absence of organic directing agent and using a reaction mixture having a silica to alumina molar ratio of 20 to 200 and a water to silica molar ratio of less than 8. The zeolite product is said to have a silica to alumina molar ratio greater than 12, but product aluminum concentrations are not reported in the Examples.

U.S. Pat. No. 6,692,723 discloses a zeolite of the MTT framework type comprising crystals with a size of less than 5 µm, at least a portion of which are in the form of aggregates having a granulometry such that the dimension Dv, 90 is in the range 40 nm to 100 µm. The zeolite can be produced using alkylated polymethylene α-ω diammonium compounds as the directing agent and the synthesis Examples produce materials having a Si/Al ratio in the range 18.6 to 18.9 (silica to alumina molar ratio of 37.2 to 37.8).

U.S. Pat. No. 7,157,075 discloses that MTT framework type zeolites can be synthesized using as a directing agent at least one nitrogen-containing organic compound selected from the group consisting of N,N,N',N'-tetramethyl-propane-1,3-diamine, N-isopropyl-isoamylamine, N,N-dimethyl-N'-isopropyl-ethanediamine, N-isopropyl-propane-1,3-amine, N,N-dimethyl-N'-ethyl-ethanediamine, N,N,N,N'N'-pentamethyl-propane-1,3-diammonium cations, N,N'-diisopropyl-pentane-1,5-diamine, N,N'-diisobutyl-propane-1,3-diamine, N,N,'-di-tertbutyl-pentane-1,5-diamine, N,N'-diisobutyl-heptane-1,7-diamine, N,N,N',N'-tetramethyl-N'-4-methylpentyl-propane-1,3-diammonium cations, trimethyl-pentyl ammonium cations, ethyl-(3-methyl-butyl)-amine, (3-dimethylamino-propyl)-dimethyl-pentyl ammonium cations, 2-aminoheptane, 3,3'-iminobis(N,N-dimethyl-propylamine, and certain polymeric amines. The lowest silica to alumina molar ratio reported for the zeolites of the Examples is 33.

U.S. Pat. No. 7,390,763 discloses a small crystal SSZ-32 zeolite, designated as SSZ-32X, which is reported to have a mole ratio of silicon oxide to aluminum oxide greater than about 20:1 to less than 40:1, crystallites with small broad lathe-like components in the range of 200-400 A, and an external surface area in the range from 80 to 300 m²/gm. The zeolite is produced using a mixture of N-lower alkyl-N'-isopropyl-imidazolium cations and an alkylamine as the structure directing agent. The only synthesis Example produced a zeolite having a silica to alumina molar ratio of 29 (see Example 1).

According to the present invention, it has now been found that Triquat-7 is effective as a directing agent in the production of pure phase MTT framework type zeolites at higher aluminum concentrations than those previously exemplified in U.S. Pat. No. 5,332,566. Moreover, the resultant product, composed of aggregates of small crystals of MTT zeolite with a low silica to alumina molar ratio (typically less than 45), is found to have improved activity and selectivity as a dewaxing catalyst as compared to a catalyst prepared from MTT zeolite crystals with a high $Si/Al_2$ ratio of >100/1.

Although the foregoing comments have focussed on aluminosilicates having the MTT framework type, it will be understood that molecular sieves having the same framework type can be produced in which part or all of the aluminum is replaced with other trivalent elements and part or all of the silicon is replaced with other tetravalent elements.

SUMMARY

In one aspect, the invention resides in a process of producing an MTT framework type molecular sieve, the process comprising:
(a) preparing a mixture capable of forming said molecular sieve, said mixture comprising sources of alkali or alkaline earth metal (M), an oxide of trivalent element (X), an oxide of tetravalent element (Y), water and a directing agent (R) of the formula $CH_3)_3N^+CH_2CH_2CH_2N^+(CH_3)_2CH_2CH_2CH_2N^+(CH_3)_3$, and having a composition, in terms of mole ratios, within the following ranges.

| | |
|---|---|
| $YO_2/X_2O_3$ | less than 45 |
| $H_2O/YO_2$ | 5 to 100 |
| $OH^-/YO_2$ | 0.05 to 0.5 |
| $M/YO_2$ | 0.05 to 0.5 |
| $R/YO_2$ | >0 to <0.5; and |

(b) maintaining said mixture under sufficient conditions to produce said MTT framework type molecular sieve.

Conveniently, the $YO_2/X_2O_3$ molar ratio of the mixture is less than 35, preferably less than 30, and typically from 25 to less than 30.

Conveniently, the $OH^-/YO_2$ molar ratio of the mixture is from 0.1 to less than 0.5, such as from 0.2 to less than 0.4.

Conveniently, the $R/YO_2$ molar ratio is from 0.01 to less than 0.3, such as from 0.01 to less than 0.1.

In one embodiment, X is aluminum and Y is silicon.

Conveniently, the mixture further comprises seed crystals, typically of an MTT framework type molecular sieve, in sufficient amount to enhance synthesis of said crystalline material, such as at least 500 ppm.

Conveniently, said conditions include a temperature from about 150° C. to about 200° C.

In a further aspect, the invention resides in an MTT framework type molecular sieve having a silica to alumina molar ratio less than 30, such as from 25 to less than 30. Alternatively, the invention resides in an MTT framework type molecular sieve having a silica to alumina molar ratio less than 29, such as from 25 to less than 29.

In a further aspect, the invention resides in a process for dewaxing a paraffin-containing feed comprising contacting said feed under dewaxing conditions with an MTT framework type molecular sieve as described herein.

DETAILED DESCRIPTION OF THE PREFERRED EMBODIMENTS

Described herein is an MTT framework type molecular sieve having a low $YO_2/X_2O_3$ molar ratio, that is a high concentration of the trivalent element X, and in particular to an aluminosilicate zeolite ZSM-23 with a silica to alumina molar ratio less than 30, such as from 25 to less than 30, or a molar ratio less than 29, such as from 25 to less than 29. Also described is a process for producing the novel molecular sieve using Triquat-7 as a structure directing agent and to a method of using the molecular sieve as a catalyst in the isomerization of paraffin-containing feeds.

In addition to providing a low silica to alumina ratio, MTT molecular sieves synthesized according to the invention also have a relatively low surface area, such as 80 $m^2/g$ or less. Without being bound by any particular theory, lower silica to alumina ratios tend to lead to increased reactivity for zeolites. The low surface area of the zeolites made according to the invention means that the zeolites will pack more densely within a reactor. Thus, the combination of low silica to alumina ratio and low surface area will provide for an increased amount of catalytic activity per volume relative to prior MTT molecular sieves.

The ZSM-23 produced herein has an X-ray diffraction pattern with characteristic lines as set out in Table 1 below:

TABLE 1

| Interplanar d-Spacing (Å) | Relative Intensity (I/Io) |
|---|---|
| 11.2 ± 0.33 | m |
| 10.1 ± 0.20 | w |
| 7.87 ± 0.15 | w |
| 5.59 ± 0.10 | w |
| 5.44 ± 0.10 | w |
| 4.90 ± 0.10 | w |
| 4.53 ± 0.10 | s |
| 3.90 ± 0.08 | vs |
| 3.72 ± 0.08 | vs |
| 3.62 ± 0.07 | vs |
| 3.54 ± 0.07 | m |
| 3.44 ± 0.07 | s |
| 3.36 ± 0.07 | w |
| 3.16 ± 0.07 | w |
| 3.05 ± 0.06 | w |
| 2.99 ± 0.06 | w |
| 2.85 ± 0.06 | w |
| 2.54 ± 0.05 | m |
| 2.47 ± 0.05 | w |
| 2.40 ± 0.05 | w |
| 2.34 ± 0.05 | w |

These X-ray diffraction data were collected with a Scintag theta-theta powder diffraction system, equipped with a graphite diffracted beam monochromator and scintillation counter, using copper K-alpha radiation. The diffraction data were recorded by step-scanning at 0.05 degrees of two-theta, where theta is the Bragg angle, and a counting time of 1 second for each step. The interplanar spacings, d's, were calculated in Angstrom units (Å), and the relative intensities of the lines, I/Io, where Io is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75-100), s=strong (50-74), m=medium (25-49) and w=weak (0-24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The MTT framework type molecular sieve prepared hereby has a composition involving the molar relationship:

$$nYO_2:X_2O_3$$

wherein X is a trivalent element, such as aluminum, boron, iron, indium and/or gallium, preferably aluminum; Y is a tetravalent element, such as silicon, tin and/or germanium, preferably silicon; and n is less than 45 and preferably is less than 30, more preferably less than 29, such as from 25 to less than 29. It is believed that MTT framework type molecular sieves with a silica to alumina molar ratio less than 29 have not previously been synthesized. By virtue of this low silica to alumina molar ratio, the present ZSM-23 has a high acid activity, typically such that it exhibits an Alpha Value of greater than 200. The Alpha Value test is a measure of the cracking activity of a catalyst and is described in U.S. Pat. No. 3,354,078 and in the *Journal of Catalysis*, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the *Journal of Catalysis*, Vol. 61, p. 395.

The present MTT framework type molecular sieve is produced by initially producing a reaction mixture capable of forming said molecular sieve and comprising sources of alkali or alkaline earth metal (M), an oxide of trivalent element (X), an oxide of tetravalent element (Y), water and a directing agent (R) of the formula $(CH_3)_3N^+CH_2CH_2CH_2N^+(CH_3)_2CH_2CH_2CH_2N^+(CH_3)_3$ (Triquat-7), wherein the reaction mixture has a composition, in terms of mole ratios, within the following ranges.

| Component | Useful | Preferred |
|---|---|---|
| $YO_2/X_2O_3$ | less than 45 | less than 35 |
| $H_2O/YO_2$ | 5-100 | 10-50 |
| $OH^-/YO_2$ | 0.05 to 0.5 | 0.1-<0.5 |
| $R/YO_2$ | >0 to <0.5 | 0.01-<0.3 |
| $M/YO_2$ | 0.05 to 0.5 | 0.1-0.4 |

Generally, the $YO_2/X_2O_3$ molar ratio of the reaction mixture is less than 30, and typically from 25 to less than 30. Generally, the $OH^-/YO_2$ molar ratio of the mixture is from 0.2 to less than 0.4 and $R/YO_2$ molar ratio is from 0.01 to less than 0.1.

When the desired molecular sieve is an aluminosilicate zeolite, suitable sources of $YO_2$ that can be used to produce the reaction mixture described above include colloidal silica, precipitated silica, potassium silicate, sodium silicate, and fumed silica. Similarly, suitable sources of $X_2O_3$ include hydrated aluminum oxides, such as boehmite, gibbsite, and pseudoboehmite, sodium aluminate and oxygen-containing aluminum salts, such as aluminum nitrate. Suitable sources of alkali metal include sodium and/or potassium hydroxide.

In one embodiment, the reaction mixture also contain seeds, typically of an MTT framework type molecular sieve, in sufficient amount to enhance synthesis of said crystalline material, such as at least 500 ppm, for example at least 1,000 ppm, such as at least 10,000 ppm of the overall reaction mixture.

Crystallization is carried out under either stirred or static conditions, preferably stirred conditions, at a temperature from about 150° C. to about 200° C., such as from about 160° C. to about 180° C. Generally, crystallization is conducted for from about 24 to about 300 hours, such as from about 72 to about 200 hours, whereafter the resultant ZSM-23 product are separated from the mother liquor and recovered. Generally, the ZSM-23 product is in the form of aggregates of small crystals having an average crystal size of about 0.02 to about 0.5 microns and an external surface area of less than 80 m²/g.

In its as-synthesized form, the ZSM-23 produced by the present process contains the Triquat-7 used as the directing agent and, prior to use as a catalyst or adsorbent, the as-synthesized material is normally treated to remove part or all of this organic constituent. This is conveniently effected by heating the as-synthesized material at a temperature of from about 250° C. to about 550° C. for from 1 hour to about 48 hours.

To the extent desired, the original sodium and/or potassium cations of the as-synthesized material can be replaced in accordance with techniques well known in the art, at least in part, by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

The crystalline molecular sieve produced by the present process, when employed either as an adsorbent or as a catalyst in an organic compound conversion process should be dehydrated, at least partially. This can be done by heating to a temperature in the range of 200° C. to about 370° C. in an atmosphere such as air or nitrogen, and at atmospheric, sub-atmospheric or superatmospheric pressures for between 30 minutes and 48 hours. Dehydration can also be performed at room temperature merely by placing the ZSM-23 in a vacuum, but a longer time is required to obtain a sufficient amount of dehydration.

Synthetic ZSM-23 crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-23 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

When used as a catalyst, it may be desirable to incorporate the present ZSM-23 with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina, titania and/or zirconia. The latter may be either naturally occurring or in the form of gelatinous precipitates, sols or gels including mixtures of silica and metal oxides. Use of a material in conjunction with the ZSM-23, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g. bentonite and kaolin. These materials, i.e. clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present molecular sieve can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components can also be used.

The relative proportions of the MTT molecular sieve and matrix may vary widely with the sieve content ranging from about 1 to about 90 percent by weight, and more usually in the range of about 2 to about 80 percent by weight of the composite. In various embodiments, the sieve content of the catalyst can be about 90 percent by weight or less, or about 85 percent or less, or about 80 percent or less, or about 70 percent or less. The sieve content can be at least about 1 percent by weight, or at least about 2 percent, or at least about 5 percent, or at least about 15 percent, or at least about 20 percent, or at least about 25 percent.

Aluminosilicate ZSM-23 produced herein is useful as a catalyst in organic compound, and in particular hydrocarbon, conversion reactions where high activity is important. In particular, when combined with a hydrogenation component, such as platinum, palladium or rhenium, the ZSM-23 is useful in the isomerization dewaxing of paraffinic hydrocarbon feedstocks.

The feedstocks that can be dewaxed using the present catalyst range from relatively light distillate fractions such as kerosene and jet fuel up to high boiling stocks such as whole crude petroleum, reduced crudes, vacuum tower residua, cycle oils, synthetic crudes (e.g., shale oils, tars and oil, etc.), gas oils, vacuum gas oils, foots oils, Fischer-Tropsch derived waxes, and other heavy oils. Straight chain n-paraffins either alone or with only slightly branched chain paraffins having 16 or more carbon atoms are sometimes referred to as waxes. The feedstock will often be a $C_{10}$+ feedstock generally boiling above about 350° F. (177° C.), since lighter oils will usually be free of significant quantities of waxy components. However, the catalyst is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock will normally be a $C_{10}$+ feedstock containing paraffins, olefins, naphthenes, aromatic and heterocyclic compounds and with a substantial proportion of higher molecular weight n-paraffins and slightly branched paraffins which contribute to the waxy nature of the feedstock. During the processing, the n-paraffins are isomerized to branched paraffins but also undergo some cracking or hydrocracking to form liquid range materials which contribute to a low viscosity product. The degree of cracking which occurs is, however, limited so that the yield of products having boiling points below that of the feedstock is reduced, thereby preserving the economic value of the feedstock.

The conditions under which the isomerization/dewaxing process is carried out generally include a temperature which falls within a range from about 392° F. to about 800° F. (200° C. to 427° C.), and a pressure from about 15 to about 3000 psig (204 to 20771 kPa). More preferably the pressure is from about 100 to about 2500 psig (790 to 17339 kPa). The liquid hourly space velocity during contacting is generally from about 0.1 to about 20, more preferably from about 0.1 to about 5. The contacting is preferably carried out in the presence of hydrogen. The hydrogen to hydrocarbon ratio preferably falls within a range from about 2000 to about 10,000 standard cubic feet $H_2$ per barrel hydrocarbon, more preferably from about 2500 to about 5000 standard cubic feet $H_2$ per barrel hydrocarbon.

The invention will now be more particularly described with reference to the following Examples and the accompanying drawings.

Example 1

Preparation of HA-ZSM-23

A mixture was prepared from 975 g of water, 75 g of Triquat-7 40% solution, 180 g of Ludox HS-40 colloidal silica, 10.8 g of sodium aluminate solution (45%), and 22.8 g of 50% sodium hydroxide solution. 10 g of HA-ZSM-23 seeds ($SiO_2/Al_2O_3$ about 40/1) were then added to the mixture. The mixture had the following molar composition:

| | |
|---|---|
| $SiO_2/Al_2O_3$ | ~44 |
| $H_2O/SiO_2$ | ~53 |
| $OH^-/SiO_2$ | ~0.32 |
| $Na^+/SiO_2$ | ~0.32 |
| Triquat-7/$SiO_2$ | ~0.07 |

The mixture was reacted at 338° F. (170° C.) in a 2-liter autoclave with stirring at 250 RPM for 120 hours. The product was filtered, washed with deionized (DI) water and dried at 250° F. (120° C.). The XRD pattern of the as-synthesized material showed the typical phase of ZSM-23 topology. The SEM of the as-synthesized material showed that the material was composed of agglomerates of small crystals. The resulting ZSM-23 crystals had a $SiO_2/Al_2O_3$ molar ratio of about 41.

Example 2

Preparation of Ti-Containing HA-ZSM-23

A mixture was prepared from 975 g of water, 75 g of Triquat-7 40% solution, 180 g of Ludox HS-40 colloidal silica, 10.8 g of sodium aluminate solution (45%), 7 g of titanium ethoxide in 20 g of iso-propanol, and 22.8 g of 50% sodium hydroxide solution. Then 10 g of HA-ZSM-23 seeds ($SiO_2/Al_2O_3$ about 40/1) were added to the mixture. The mixture had the following molar composition:

| | |
|---|---|
| $SiO_2/Al_2O_3$ | ~44 |
| $H2O/SiO_2$ | ~53 |
| $OH-/SiO_2$ | ~0.32 |
| $Na+/SiO_2$ | ~0.32 |
| Triquat-7/SiO2 | ~0.07 |

The mixture was reacted at 338° F. (170° C.) in a 2-liter autoclave with stirring at 250 RPM for 120 hours. The product was filtered, washed with deionized (DI) water and dried at 250° F. (120° C.). The XRD pattern of the as-synthesized material showed the typical phase of ZSM-23 topology. The SEM of the as-synthesized material showed that the material was composed of agglomerates of small crystals. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting ZSM-23 crystals had a $SiO_2/Al_2O_3$ molar ratio of about 44 and contained 1.48 wt % of Ti.

Example 3

Preparation of HA-ZSM-23

A mixture was prepared from 975 g of water, 75 g of Triquat-7 40% solution, 180 g of Ludox HS-40 colloidal silica, 14.4 g of sodium aluminate solution (45%), and 22.8 g of 50% sodium hydroxide solution. 10 g of HA-ZSM-23 seed ($SiO_2/Al_2O_3$ about 40/1) were then added to the mixture. The mixture had the following molar composition:

| | |
|---|---|
| $SiO_2/Al_2O_3$ | ~33 |
| $H_2O/SiO_2$ | ~49 |
| $OH-/SiO_2$ | ~0.33 |
| $Na+/SiO_2$ | ~0.33 |
| Triquat-7/$SiO_2$ | ~0.07 |

Figure 1:
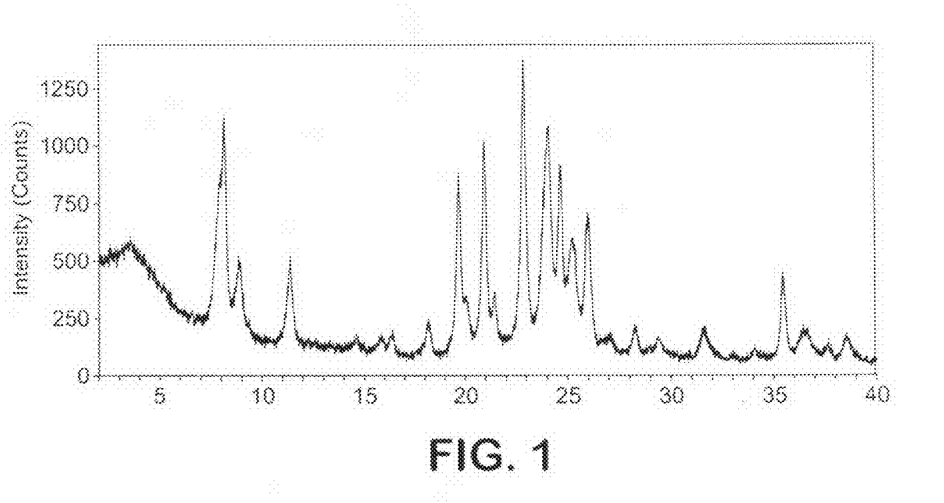
FIG. 1 is an X-ray diffraction pattern of the ZSM-23 product of Example 3.
Figure 2:
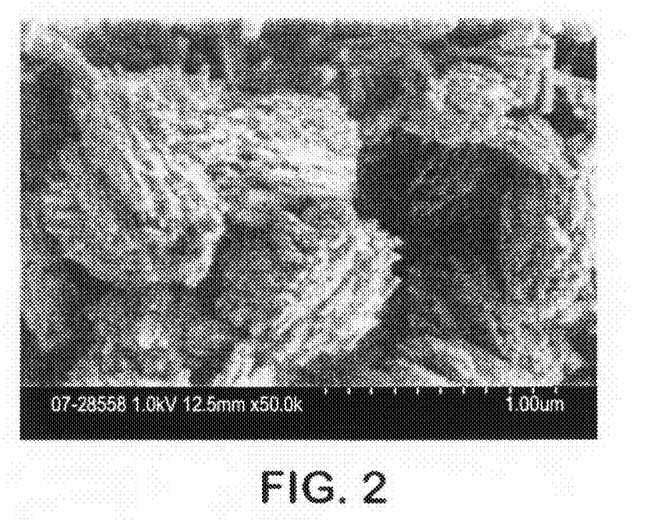
FIG. 2 is a scanning electron micrograph of the ZSM-23 product of Example 3.

The mixture was reacted at 338° F. (170° C.) in a 2-liter autoclave with stirring at 250 RPM for 120 hours. The product was filtered, washed with deionized (DI) water and dried at 250° F. (120° C.). The XRD pattern (FIG. 1) of the as-synthesized material showed the typical phase of ZSM-23 topology. The SEM (FIG. 2) of the as-synthesized material showed that the material was composed of agglomerates of small crystals. The as-synthesized crystals were converted into the hydrogen form by three ion exchanges with ammonium nitrate solution at room temperature, followed by drying at 250° F. (120° C.) and calcination at 1000° F. (540° C.) for 6 hours. The resulting ZSM-23 crystals had a $SiO_2/Al_2O_3$ molar ratio of about 31.

Example 4

Preparation of HA-ZSM-23

A mixture was prepared from 1000 g of water, 75 g of Triquat-7 40% solution, 80 g of Ultrasil silica, 14.4 g of sodium aluminate solution (45%), and 25 g of 50% sodium hydroxide solution. Then 10 g of HA-ZSM-23 seed ($SiO_2/Al_2O_3$ about 40/1) were added the mixture. The mixture had the following molar composition:

| | |
|---|---|
| $SiO_2/Al_2O_3$ | ~33 |
| $H_2O/SiO2$ | ~49 |
| $OH-/SiO2$ | ~0.33 |
| $Na+/SiO2$ | ~0.33 |
| Triquat-7/SiO2 | ~0.07 |

Figure 3:
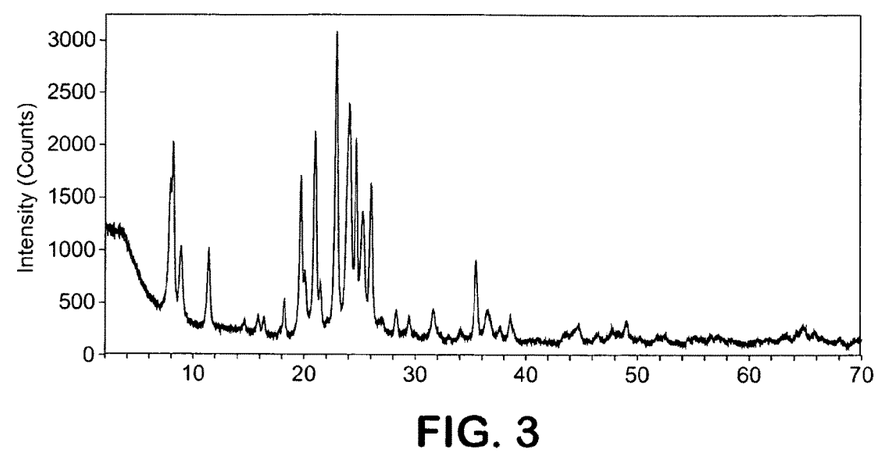
FIG. 3 is an X-ray diffraction pattern of the ZSM-23 product of Example 4.

The mixture was reacted at 338° F. (170° C.) in a 2-liter autoclave with stirring at 250 RPM for 120 hours. The product was filtered, washed with deionized (DI) water and dried at 250° F. (120° C.). The XRD pattern (FIG. 3) of the as-synthesized material showed the typical phase of ZSM-23 topology. The SEM of the as-synthesized material showed that the material was composed of agglomerates of small crystals. The resulting ZSM-23 crystals had a $SiO_2/Al_2O_3$ molar ratio of about 30.

Example 5

Preparation of HA-ZSM-23

A mixture was prepared from 1134 g of water, 94.5 g of Triquat-7 40% solution, 100.8 g of Ultrasil silica, 20.5 g of sodium aluminate solution (45%), and 22 g of 50% sodium hydroxide solution. Then 10 g of HA-ZSM-23 seed ($SiO_2/Al_2O_3$ about 40/1) were added to the mixture. The mixture had the following molar composition:

| | |
|---|---|
| $SiO_2/Al_2O_3$ | ~29 |
| $H_2O/SiO_2$ | ~48 |
| $OH^-/SiO_2$ | ~0.26 |
| $Na^+/SiO_2$ | ~0.26 |
| Triquat-7/$SiO_2$ | ~0.07 |

Figure 4:
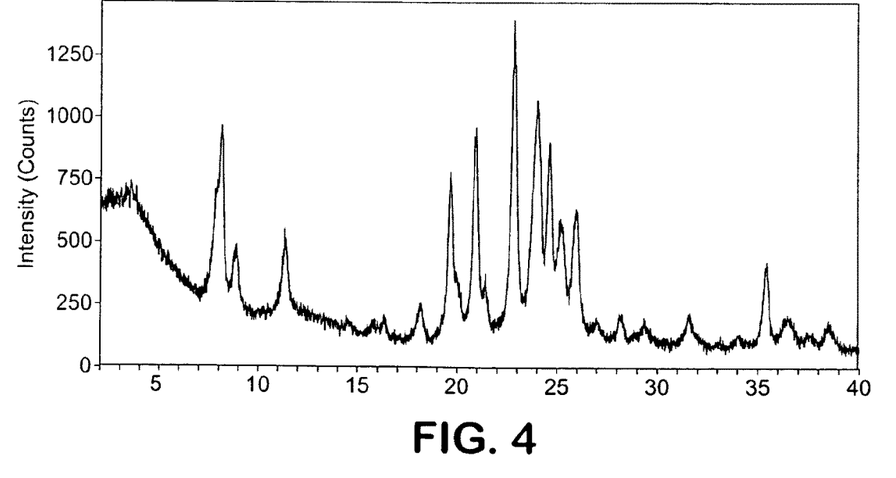
FIG. 4 is an X-ray diffraction pattern of the ZSM-23 product of Example 5.
Figure 5:
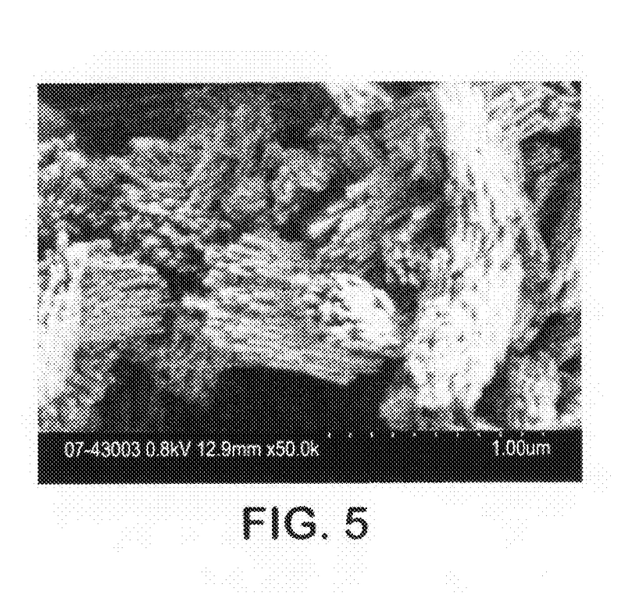
FIG. 5 is a scanning electron micrograph of the ZSM-23 product of Example 5.

The mixture was reacted at 338° F. (170° C.) in a 2-liter autoclave with stirring at 250 RPM for 120 hours. The product was filtered, washed with deionized (DI) water and dried at 250° F. (120° C.). The XRD pattern (FIG. 4) of the as-synthesized material showed the typical phase of ZSM-23 topology. The SEM (FIG. 5) of the as-synthesized material showed that the material was composed of agglomerates of small elongated crystals. The resulting ZSM-23 crystals had a $SiO_2/Al_2O_3$ molar ratio of about 29.

Example 6

Preparation of HA-ZSM-23

A mixture was prepared from 1134 g of water, 95 g of Triquat-7 40% solution, 101 g of Ultrasil silica, 22 g of sodium aluminate solution (45%), and 21 g of 50% sodium hydroxide solution. Then 10 g of HA-ZSM-23 seed ($SiO_2/Al_2O_3$ about 40/1) were added to the mixture. The mixture had the following molar composition:

| | |
|---|---|
| $SiO_2/Al_2O_3$ = | 28 |
| $H_2O/SiO_2$ = | 44 |
| $OH^-/SiO_2$ = | 0.26 |
| $Na^+/SiO_2$ = | 0.26 |
| Triquat-7/$SiO_2$ = | 0.07 |

The mixture was reacted at 338° F. (170° C.) in a 2-liter autoclave with stirring at 250 RPM for 144 hours. The product was filtered, washed with deionized (DI) water and dried at 250° F. (120° C.). The XRD pattern of the as-synthesized material showed the typical phase of ZSM-23 topology. The SEM of the as-synthesized material showed that the material was composed of agglomerates of small crystals. The resulting ZSM-23 crystals had a $SiO_2/Al_2O_3$ molar ratio of about 27.

Example 7

Preparation of HA-ZSM-23

A mixture was prepared from 1134 g of water, 70 g of Triquat-7 40% solution, 100.8 g of Ultrasil silica, 20.5 g of sodium aluminate solution (45%), and 20 g of 50% sodium hydroxide solution. Then 10 g of HA-ZSM-23 seed ($SiO_2/Al_2O_3$ about 40/1) were then added to the mixture. The mixture had the following molar composition:

| | |
|---|---|
| $SiO_2/Al_2O_3$ | ~29 |
| $H_2O/SiO_2$ | ~44 |
| $OH^-/SiO_2$ | ~0.25 |
| $Na^+/SiO_2$ | ~0.25 |
| Triquat-7/$SiO_2$ | ~0.05 |

The mixture was reacted at 338° F. (170° C.) in a 2-liter autoclave with stirring at 250 RPM for 120 hours. The product was filtered, washed with deionized (DI) water and dried at 250° F. (120° C.). The XRD pattern of the as-synthesized material showed the typical phase of ZSM-23 topology. The SEM of the as-synthesized material showed that the material was composed of agglomerates of small crystals. The as-synthesized ZSM-23 crystals had a $SiO_2/Al_2O_3$ molar ratio of 26.

Example 8

Preparation of HA-ZSM-23

A mixture was prepared from 1134 g of water, 95 g of Triquat-7 40% solution, 101 g of Ultrasil silica, 22 g of sodium aluminate solution (45%), and 25 g of 50% sodium hydroxide solution. Then 10 g of HA-ZSM-23 seeds ($SiO_2/Al_2O_3$ about 40/1) were added to the mixture. The mixture had the following molar composition:

| | |
|---|---|
| $SiO_2/Al_2O_3$ | ~27 |
| $H_2O/SiO_2$ | ~44 |
| $OH^-/SiO_2$ | ~0.29 |
| $Na^+/SiO_2$ | ~0.29 |
| Triquat-7/$SiO_2$ | ~0.07 |

The mixture was reacted at 338° F. (170° C.) in a 2-liter autoclave with stirring at 250 RPM for 168 hours. The product was filtered, washed with deionized (DI) water and dried at 250° F. (120° C.). The XRD pattern of the as-synthesized material showed the typical phase of ZSM-23 topology. The SEM of the as-synthesized material showed that the material was composed of agglomerates of small elongated crystals. The resulting ZSM-23 crystals had a $SiO_2/Al_2O_3$ molar ratio of about 26.

Example 9

(Comparative): 0.6% Pt/65/35 ZSM-23 ($SiO_2/Al_2O_3$~135/1)/$Al_2O_3$ Catalyst 65% ZSM-23 with a $SiO_2/Al_2O_3$ molar ratio of 135 and 35% alumina were extruded to form a catalyst for testing. The extrudate was calcined in nitrogen for 3 hours at 900° F. (482° C.) and then switched to an air calcination unit at 1000° F. (540° C.) for 6 hours. The extrudate was then ammonium exchanged with 1N ammonium nitrate solution, followed by platinum exchange to achieve 0.6 wt % loading. The platinum containing catalyst was calcined in air at 715° F. (379° C.) for 4 hours.

Example 10

0.6 wt % Pt on Pelletized/Sized 65% ZSM-23 ($SiO_2/Al_2O_3$~40/1) from Example 1/Alumina Catalyst The crystals obtained from Example 1 were formed into a catalyst for decane isomerization evaluation. The zeolite was converted to its H-form through pre-calcination in nitrogen (3 hours at 540° C.), ammonium exchange with 1N ammonium nitrate solution, and final calcination in air (6 hours at 540° C.). The H-form crystal was then pelletized and sized to 14/24 mesh with alumina in a 65% H-ZSM-23/35% alumina ratio followed by calcination in air (6 hours at 540° C.) to convert the pseudobohemite alumina to the gamma phase. The sized material was then impregnated via incipient wetness to 0.6 wt % Pt with tetraamminplatinumnitrate solution and calcined in air for 3 hours at 360° C.

Example 11

0.6 wt % Pt on Pelletized/Sized 65% ZSM-23 ($SiO_2/Al_2O_3$~32/1) from Example 3/Alumina The crystals from Example 3 were formed into a catalyst for decane isomerization evaluation. The zeolite was converted to its H-form through pre-calcination in nitrogen (3 hours at 540° C.), ammonium exchange with 1N ammonium nitrate solution, and final calcination in air (6 hours at 540° C.). The H-form crystal was then pelletized and sized to 14/24 mesh with alumina in a 65% H-ZSM-23/35% alumina ratio followed by calcination in air (6 hours at 540° C.) to convert the pseudobohemite alumina to the gamma phase. The sized material was then impregnated via incipient wetness to 0.6 wt % Pt with tetraamminplatinumnitrate solution and calcined in air for 3 hours at 360° C.

Example 12

0.6 wt % Pt on Pelletized/Sized 65% ZSM-23 (SiO$_2$/Al$_2$O$_3$~29/1) from Example 5/Alumina The crystals from Example 5 were formed into a catalyst for decane isomerization evaluation. The zeolite was converted to its H-form through pre-calcination in nitrogen (3 hours at 540° C.), ammonium exchange with 1N ammonium nitrate solution, and final calcination in air (6 hours at 540° C.). The H-form crystal was then pelletized and sized to 14/24 mesh with alumina in a 65% H-ZSM-23/35% alumina ratio followed by calcination in air (6 hours at 540° C.) to convert the pseudobohemite alumina to the gamma phase. The sized material was then impregnated via incipient wetness to 0.6 wt % Pt with tetraamminplatinumnitrate solution and calcined in air for 3 hours at 360° C. Note that the low silica to alumina ratio for this catalyst may increase the difficulty of achieving a desired level of ion exchange.

Example 13

Decane Isomerization Results of Catalyst from Examples 9, 10, and 11

Figure 6:
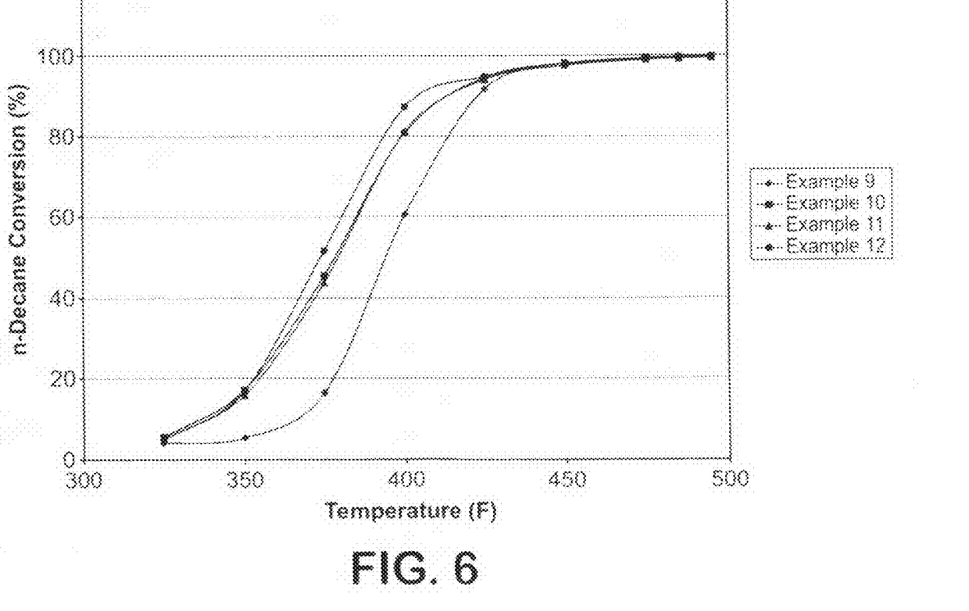
FIG. 6 compares the decane isomerization activity (decane conversion against temperature) for the Pt-containing ZSM-23 catalysts of Examples 10 to 12 with that for Example 9.
Figure 7:
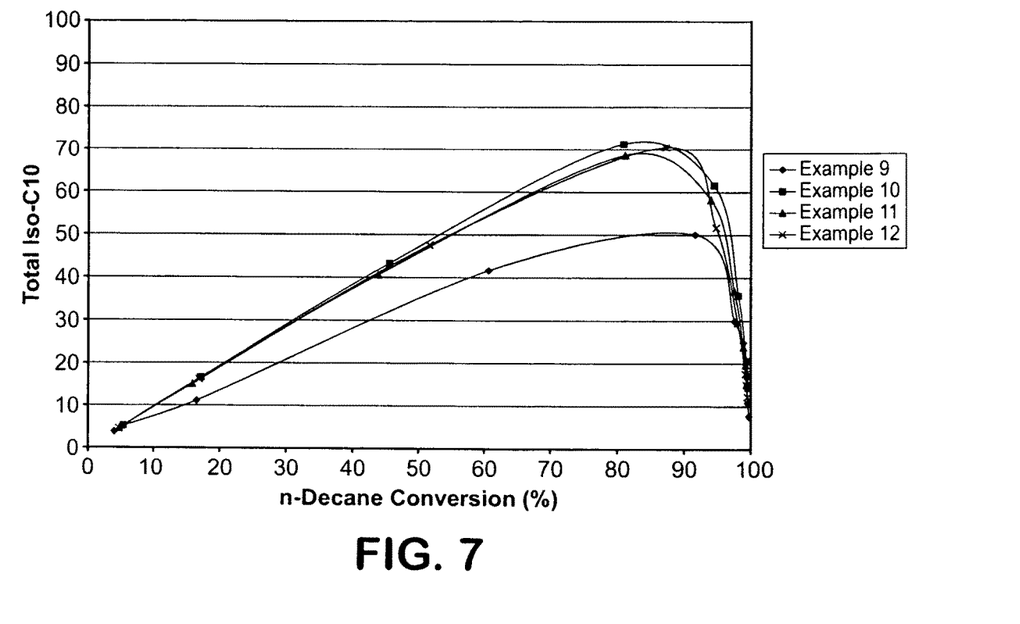
FIG. 7 compares the decane isomerization selectivity (total iso-$C_{10}$ isomers against decane conversion) for the Pt-containing ZSM-23 catalysts of Examples 10 to 12 with that for Example 9.

The decane isomerization test is performed at atmospheric pressure, and the reactor vessel is quartz. Catalysts are crushed and sized to 14/25 mesh, and 1 g of sized catalyst is used for this test. The sample is first heated under nitrogen to 500° F. (260° C.), followed by reduction in hydrogen for 3 hours at atmospheric pressure. The temperature is then reduced to 325° F. (163° C.), and the flow of feed is started. The feed consists of 200 cc/min hydrogen and 0.548 cc/hr liquid n-decane, delivered by a MFC and ISCO pump, respectively. After lining the catalyst out at this temperature, the product from the reactor is analyzed by an on-line GC, and the next setpoint temperature is attained. Each catalyst is evaluated at a total of 9 different temperatures from 325° F. (163° C.) to 495° F. (257° C.). FIGS. 6 and 7 show the decane isomerization performance of the catalysts from Examples 9, 10, 11 and 12. FIG. 6 shows the activity of the materials whereas FIG. 7 shows the isomerization selectivity of the materials. The low Si/Al$_2$ ZSM-23 catalysts of Examples 10 to 12 are more active and more importantly are more selective, than the high Si/Al2 ratio (~135/1) ZSM-23 catalyst of Example 9.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A process of producing a ZSM-23 molecular sieve, the process comprising:
    (a) preparing a mixture capable of forming said molecular sieve, said mixture comprising sources of alkali or alkaline earth metal (M), an oxide of trivalent element (X), an oxide of tetravalent element (Y), water and a directing agent (R) of the formula $(CH_3)_3N^+CH_2CH_2CH_2N^+(CH_3)_2CH_2CH_2CH_2N^+(CH_3)_3$, and having a composition, in terms of mole ratios, within the following ranges:
    YO$_2$/X$_2$O$_3$ 25 to 28
    H$_2$O/YO$_2$ 5 to 100
    OH$^-$/YO$_2$ 0.05 to 0.5
    M/YO$_2$ 0.05 to 0.5
    R/YO$_2$ >0 to <0.5; and
    (b) maintaining said mixture under sufficient conditions to produce said ZSM-23 molecular sieve.

2. The process of claim 1, wherein the YO$_2$/X$_2$O$_3$ molar ratio is 28.

3. The process of claim 1, wherein the YO$_2$/X$_2$O$_3$ molar ratio is 27.

4. The process of claim 1, wherein the OH$^-$/YO$_2$ molar ratio is from 0.1 to less than 0.5.

5. The process of claim 1, wherein the OH$^-$/YO$_2$ molar ratio is from 0.2 to 0.4.

6. The process of claim 1, wherein the R/YO$_2$ molar ratio is from 0.01 to less than 0.3.

7. The process of claim 1, wherein the R/YO$_2$ molar ratio is from 0.01 to less than 0.1.

8. The process of claim 1, wherein X is aluminum and Y is silicon.

9. The process of claim 1, wherein said mixture further comprises seed crystals in sufficient amount to enhance synthesis of said crystalline material.

10. The process of claim 9, wherein said seed crystals comprise a ZSM-23 molecular sieve.

11. The process of claim 10, wherein said mixture comprises at least 500 ppm of said seed crystals.

12. The process of claim 1, wherein said conditions include a temperature from about 150° C. to about 200° C.

13. A ZSM-23 molecular sieve having a silica to alumina molar ratio of 25 to 29 and an external surface area less than about 80 m$^2$/g.

14. The molecular sieve of claim 13, wherein the silica to alumina molar ratio is 25 to less than 29.

15. The molecular sieve of claim 13, wherein the silica to alumina molar ratio is 27.

16. A process for dewaxing a paraffin-containing feed comprising contacting said feed under dewaxing conditions with the ZSM-23 molecular sieve of claim 13.

17. A ZSM-23 molecular sieve having a silica to alumina molar ratio from 25 to 28.

18. The molecular sieve of claim 17, wherein the external surface area of the molecular sieve is less than about 80 m$^2$/g.

19. A process for dewaxing a paraffin-containing feed comprising contacting said feed under dewaxing conditions with the ZSM-23 molecular sieve of claim 17.

* * * * *